_United States Patent_ [19]

Guillaneux et al.

[11] 3,935,504

[45] Jan. 27, 1976

[54] METHOD AND APPARATUS FOR INJECTION OF A PLASMA

[75] Inventors: Pierre Guillaneux, Chaville; Claude Patou, Le Perreux; Gianfranco Tonon, Limeil-Brevannes, all of France

[73] Assignee: Commissariat a l'Energie Atomique, Paris, France

[22] Filed: Aug. 16, 1971

[21] Appl. No.: 172,094

[30] Foreign Application Priority Data

Aug. 19, 1970 France.......................... 70.30425

[52] U.S. Cl. ........ 315/111.7; 313/231.3; 313/231.4; 315/111.2; 315/111.4
[51] Int. Cl. ........................... H05h 1/04; H05h 1/22
[58] Field of Search........... 315/111.2, 111.3, 111.6, 315/111.7, 248, 267, 289, 344; 313/153, 155, 157, 161, 231.2, 231.4; 219/121 P, 121 L, 121 LM; 328/233

[56] References Cited
UNITED STATES PATENTS

| 3,361,927 | 1/1968 | Buhler | 315/111 |
| 3,467,885 | 9/1969 | Cann | 315/111.7 |
| 3,610,989 | 10/1971 | Bennett | 315/111.2 |

*Primary Examiner*—James W. Lawrence
*Assistant Examiner*—E. R. LaRoche
*Attorney, Agent, or Firm*—Cameron, Kerkam, Sutton, Stowell & Stowell

[57] ABSTRACT

A plasma injection method, in which a magnetic field is produced which has a configuration in the form of a convergent nozzle so that there is a high magnetic field gradient between the inlet and the neck of said nozzle, the lines of the magnetic field being substantially perpendicular to the axis of the said nozzle, and in that the said plasma is produced at the inlet and along the axis of said nozzle by appropriate means, the said magnetic field gradient having the effect of injecting said plasma from the inlet to the neck of the said nozzle.

11 Claims, 3 Drawing Figures

METHOD AND APPARATUS FOR INJECTION OF A PLASMA

This invention relates to a method of and apparatus for injection of a plasma so that the kinetic energy of the ions of the plasma is converted into thermal energy, thus increasing the temperature of the plasma. One very advantageous feature of the present invention is that a dense and hot plasma is obtained for a relatively long time.

The methods generally used to obtain a plasma in a given volume comprise directly injecting a plasma formed from a pulsating plasma source, or a beam of ions issuing from a high-intensity ion source, into the said volume. The latter is generally surrounded by containing means which in most cases serve to bound the said volume. Magnetic mirrors may surround the volume into which the plasma is injected and in that case it is the action of the magnetic field on the ions and the electrons of the plasma which holds the latter in the volume. However, the plasma injected is generally of a low density and at a low temperature. To increase the temperature and the density of this plasma it is possible, for example, to reduce the volume in which the plasma is situated but instability problems are then very rapidly encountered and are very difficult to solve.

The present invention proposes a method of and apparatus for injecting a plasma which are more suited to practical requirements than the prior art, particularly inasmuch as they give a high-density and high temperature plasma.

To this end the invention proposes a method of plasma injection intended to bring the plasma to high temperature, characterised in that a magnetic field is produced which has a configuration in the form of a convergent nozzle so that there is a high magnetic field gradient between the inlet and the neck of said nozzle, the lines of the magnetic field being substantially perpendicular to the axis of the said nozzle, and in that the said plasma is produced at the inlet and along the axis of said nozzle by appropriate means, the said magnetic field gradient having the effect of injecting said plasma from the inlet to the neck of the said nozzle.

The plasma may advantageously be produced by the interaction of a beam of light from a laser source and a solid target.

The magnetic nozzle may advantageously be embodied by using magnetic coils or the electrical discharge produced between the two electrodes of a coaxial gun of the "FOCUS" type.

The invention also proposes apparatus for plasma injection, characterised in that it comprises a coaxial gun of the FOCUS type comprising a hollow cylindrical outer electrode which surrounds a cylindrical inner electrode without contact and a window formed in said outer electrode, which forms a sealed enclosure, a solid target disposed on the axis of said gun and near the free end of the said inner electrode, means for injecting a gas into said enclosure, means for producing an electrical discharge between the said two electrodes, a triggered laser, an optical system for focusing the laser beam substantially on said target and means for synchronising the triggering of the light emission of said lasser and the said discharge.

The invention will be more readily understood from the following description of one exemplified embodiment of the invention which is given without limiting force. The description is given with reference to the accompanying drawings wherein.

Figure 1:
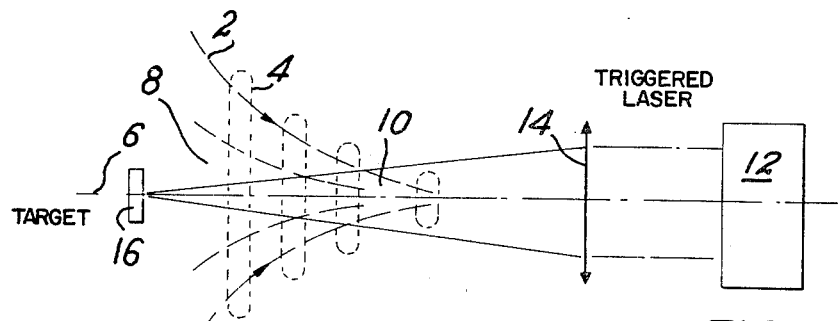
FIG. 1 illustrates a variant of the method according to the invention.

According to the invention, a plasma is formed at the inlet of a convergent magnetic nozzle. The plasma is formed on the axis of the nozzle. The plasma consequently experiences an acceleration from the nozzle inlet to the nozzle neck, at which zone the magnetic field strength is at a maximum. In FIG. 1, the convergent magnetic nozzle is illustrated diagrammatically by current lines 2 resulting from an electrical discharge shown in broken lines, and by the configuration of the magnetic field illustrated by broken-line rings 4. The rings are substantially perpendicular to the nozzle axis 6 and are centered on this axis which is an axis of symmetry for the current lines 2. When a plasma is formed by appropriate means at the inlet 8 of the magnetic nozzle, the plasma is accelerated in the direction of the neck 10 of the nozzle in which it is confined. This acceleration is due to the high magnetic field gradient existing between the nozzle inlet and neck. The kinetic energy of the ions of the plasma which are set in motion is then converted into thermal energy and the temperature of the plasma can then be greatly increased. In FIG. 1, the means used to form the plasma are advantageously a triggered laser 12 delivering giant light pulses which are focused by an optical system 14 onto a solid target 16 situated on the axis 6 of the magnetic nozzle. The beam of light from the laser 12 penetrates into the magnetic nozzle via the neck 10 and is focused substantially at the inlet of the nozzle, where the target 16 is situated. Formation of the plasma by means of a laser is very advantageous because the speed of expansion of such a plasma is higher in the direction of the laser. In simple terms it may be said that the plasma "rises" towards the light source. The kinetic energy communicated to the ions of the plasma injected into the neck 10 of the nozzle is then due firstly to the magnetic field gradient and secondly to the action of the laser beam. Other means, such as an electrical discharge, may be used to produce the plasma at the inlet of the convergent magnetic nozzle. However, the acceleration of the ions is then due solely to the magnetic field gradient.

Figure 2:
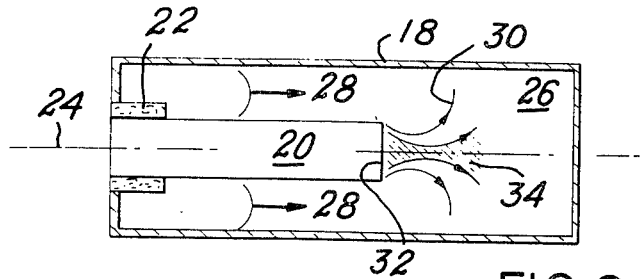
FIG. 2 illustrates a coaxial gun of the FOCUS type.

The production of a magnetic field having a convergent nozzle configuration such that there is a high magnetic field gradient between the nozzle inlet and neck is possible by any appropriate means. For example, magnetic coils may be used although it would appear to be more advantageous to use a system known as the FOCUS type of coaxial gun shown diagrammatically in FIG. 2.

A gun of this kind consists principally of a cylindrical outer electrode 18 surrounding a cylindrical inner electrode 20 without contact. The electrical insulation between the inner and outer electrodes is provided by an insulating ring 22. The axis of symmetry of this coaxial gun is the axis 24 which is common to the cylindrical electrodes 18 and 20. The outer and inner electrodes 18 and 20 bound a sealed chamber 26 inside which means not shown allow a gas to be introduced. When an adequate potential difference is produced between the two electrodes, for example by means of a battery of capacitors, an electrical discharge is produced between the two electrodes. After an axial propagation 28 of the discharge for about 2.5 microseconds, the discharge is subjected to radial compression 30 at the free end 32 of the inner electrode 20 for about 0.2 microsecond and finally a plasma 34 is obtained on the axis 24 with a life of about 0.1 microsecond. The configuration of the discharge current lines is successively of the form shown in FIG. 2 and it will be seen that at the end of the discharge the current lines have the form of a convergent nozzle. These current lines induce a magnetic field of a direction perpendicular to the current lines so that at the end of the discharge there is a magnetic configuration in the form of a convergent nozzle, the nozzle inlet being the free end 32 of the electrode 20 and the nozzle neck being substantially at the focal point of the current lines on the axis 24. The strength of the magnetic field produced is inversely proportional to the radii of the rings 4 representing the magnetic field lines so that the magnetic field strength inside the nozzle neck is much higher than at the nozzle inlet and may be as much as several magagauss. There is therefore a high magnetic field gradient between the neck and the inlet and the magnetic field strength in this latter region is only some 10's of kilogauss. If a plasma is formed on the gun axis and at the inlet of the magnetic convergent nozzle, the plasma will be driven as far as the nozzle neck. On the one hand the plasma will be confined and on the other hand its temperature will be considerably increased because the kinetic energy communicated to the plasma ions is converted into thermal energy. This plasma can be formed very advantageously by means of a laser beam interacting with a solid target situated on the axis 24 of the FOCUS gun and at the free end 32 of the inner electrode 20. It is also very advantageous that the beam of light from the laser source is propagated along the axis 24 of the gun and therefore penetrates via the nozzle neck and is then focused on the target, the effect of this arrangement being to increase the kinetic energy of the plasma ions. In addition to the injection of a plasma into a convergent magnetic nozzle with the effect of giving a higher plasma temperature, the present invention enables the life of the plasma formed by the discharge of the FOCUS gun to be considerably increased because the life of this plasma is really the time taken by the discharge to consume the gaseous material injected into the magnetic nozzle at the time of the compression of the discharge on the axis 24. If this material is not renewed, the discharge stops and thus the plasma can no longer exist. According to the invention, the laser plasma which is injected into the magnetic nozzle is formed just before the end of the discharge of the FOCUS gun, this corresponding substantially to the time when the discharge reaches the axis 24. While the beam of light is interacting with the target, target material is injected in plasma form at the nozzle inlet. If the laser beam flux is adequate, the flow of material which is evaporated may be capable of appreciably prolonging the life of the discharge. The time during which this discharge is prolonged is slightly less than the width of the light pulse delivered by the laser. This light pulse may advantageously be of a square shape. For example, the laser flux can be adjusted so that the number of particles injected at the nozzle inlet is equal to the number of particles lost by the plasma. The characteristics of the plasma formed initially by the discharge of the FOCUS gun are then retained for a time substantially equal to the time during which the target is heated by the laser beam. This aspect of the invention, i.e., prolonging the life of a plasma, may be very advantageous in thermonuclear fusion experiments. It is wll known that nuclear reactions can be obtained only when, for a given temperature, the product of the plasma density $n$ and its life $t$ is at least equal to a certain value (Lawson criterion). The temperature of the plasma depends in this case on the magnetic field gradient in the nozzle and on the potential difference between the two inner and outer electrodes. Since the maximum densities $n$ obtainable are slightly less than those of the solid, the plasma formed must be maintained for an adequate time $t$. The plasma energy balance can then become positive, i.e., the energy released by the fusion reactions within the plasma is at least equal to the energy expended to form and maintain the plasma.

Figure 3:
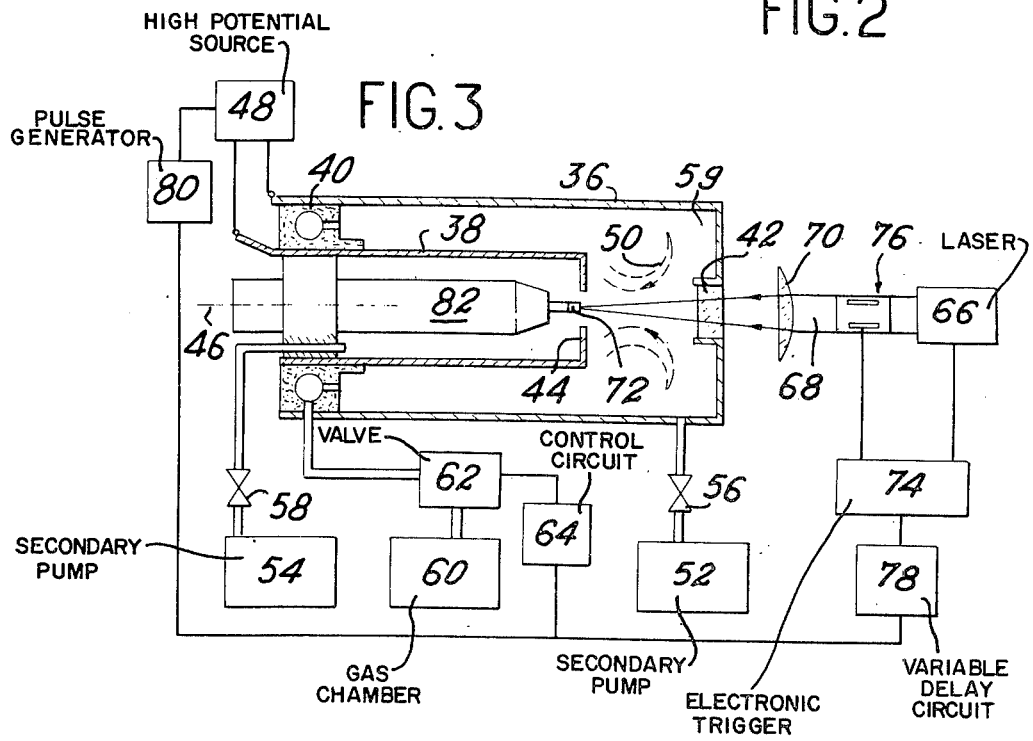
FIG. 3 illustrates one embodiment of the invention.

FIG. 3 diagrammatically illustrates an embodiment of the apparatus according to the invention, wherein a plasma produced by a laser is injected into the magnetic configuration in the form of a conversion nozzle resulting from the discharge of a coaxial gun of the FOCUS type. The apparatus comprises a coaxial gun of the FOCUS type comprising a hollow cylindrical outer electrode 36 surrounding a hollow cylindrical inner electrode 38 without contact. Electrical insulation between the two electrodes is provided by an insulant ring 40. The outer electrode 36 is provided with a window 42 in register with the free end 44 of the inner electrode 38. The window is centered on the axis 46 of the FOCUS gun, this axis being common to the two inner and outer electrodes. The electrical discharge between the two electrodes of the gun is produced by means 48 which produce a high potential difference between these two electrodes. The means 48 may, for example, be a battery of capacitors, an explosive, a superconductive current source or a rotating machine. The use of the latter allows the discharge current strength to be increased, and this may be very advantageous when it is required to increase the density and temperature characteristics of the plasma formed by the discharge. The latter, denoted by reference 50, produces a magnetic field configuration in the form of a convergent nozzle with a high magnetic field gradient. Two circuits each comprising a secondary pump 52, 54 and a valve 56, 58 allow a secondary vacuum to be produced respectively in the chamber 59 between the inner and outer electrodes 36, 38 and inside the inner electrode 38. The outlet of a chamber 60 containing a gas is connected to the enclosure 59 through a quickopening valve 62 provided with a control circuit 64. This vavle enables a quantity of gas to be injected in the form of a burst during a relatively short time. Any gas may be used, but when nuclear fusion reactions are required within the plasma it may be advantageous to use an equimolecular mixture of deuterium and tritium. A laser 66 emits giant light pulses in the form of a beam of light 68 focused via an optical system 70 and the window 43 onto a solid target 72 contained on the axis 46 of the FOCUS gun near the centre of the free end 44 of the inner electrode 38. The laser beam 68 is centered on the axis 46 of the gun. Electronic means 74 and electrooptical means 76 (represented here by an electro-optical cell) allow the light emission of the laser to be triggered. Synchronisation means formed by a variable-delay circuit 78 and a pulse generator 80 whose output is connected to the control circuit 48 for the gun discharge allow the light emission of the laser to be synchronised with the injection of gas inside the gun and with the discharge between the two inner and outer electrodes. A cryostat 82 situated on the axis 46 of the gun and inside the inner electrode 38 allows the solid target 72 to be formed from a gas which is cooled. The gas is advantageously composed of an equimolecular mixture of deuterium and tritium. The free end 44 of the inner electrode 38 has a central aperture and the outlet of the cryostat 82 is situated at the centre of said aperture so that the solid target 72 is situated on the axis 46 of the gun and near the free end 44. This arrangement advantageously enables the coaxial gun discharge to be maintained by the injection — at the inlet of the convergent magnetic nozzle — of a plasma formed by the interaction of the laser beam 68 and the solid target 72. The life of the discharge plasma can thus be very considerably increased. For this purpose, operation of the apparatus advantageously comprises the following successive operations:

Pumping of enclosure 59 and pumping of the interior of the inner electrode 38 until a secondary vacuum is obtained (less than $10^{-7}$ Torr approx.).

Production of solid target 72 is cryostat 82 and location of target in central aperture of inner electrode by means of an extractor (not shown) with which the cryostat is provided.

Closure of valves 56 and 58.

Injection of a given quantity of gas in enclosure 59 by means of quick-opening valve 62.

Control of means 48 with the aid of pulse generator 80 to obtain discharge of the coaxial gun.

Control of light emission of laser 66 by means of variable-delay circuit 78, electronic means 74 and electro-optical means 76, at time when gun discharge reaches axis 46.

Of course not all of these operations are necessary when the target 72 is in the solid state at ambient temperature.

The laser 66, may for example, be a laser having a solid active medium, such as neodymium-doped glass, a molecular laser or alternatively a chemical laser. The duration of the injection of the plasma produced by the laser pulse on the solid target 72 at the inlet of the convergent nozzle is proportional to the duration of the laser emission. It is desirable that the latter should be greater than the life of the plasma originating from the gun discharge. Since the latter is at the present time estimated at $10^{-8}$ second, the laser pulse width can be made greater than that value.

A coaxial gun of the FOCUS type whose discharge is fed with a laser plasma which is then heated in the focusing magnetic nozzle of the gun can result in a positive plasma energy balance and hence form an energy generator.

We claim:

1. Plasma injection apparatus comprising a coaxial gun of the focus type comprising a hollow cylindrical outer electrode which surrounds a cylindrical inner electrode without contact and a window formed in said outer electrode, which forms a sealed enclosure, a solid target disposed on the axis of said gun and near the free end of the said inner electrode, means for injecting a gas into said enclosure, means for producing an electrical discharge between said two electrodes, a triggered laser producing a laser beam, an optical system for focusing the laser beam substantially on said target and means for synchronising the triggering of the light emission of said laser and said discharge.

2. Apparatus according to claim 1, wherein said inner electrode is hollow, and further comprising a central aperture at the free end of said inner electrode, a cryostat in said inner electrode, an outlet for said cyrostat, said cryostat being supplied by a gas through a quick-opening valve, means for controlling said valve connected to said synchronising means, the outlet of said crystat being situated at said central aperture.

3. Apparatus according to claim 1, wherein said gas introduced into the said enclosure includes at least one hydrogen isotope.

4. Apparatus according to claim 1, wherein said laser is a neodynmium-doped glass laser.

5. Apparatus according to claim 1, wherein said laser is a $CO_2$ laser.

6. Apparatus according to claim 1, wherein said laser is a chemical laser.

7. A plasma injection method, the injection having the effect of bringing the plasma to a high temperature, consisting of the steps of producing a magnetic convergent nozzle by creating an electrical discharge of the focus type, and producing a plasma at the inlet and along the axis of said nozzle, said plasma being injected from the inlet to the neck of said nozzle.

8. A method according to claim 7, wherein said plasma is produced by impinging a laser beam on a solid target at the inlet of said nozzle.

9. A method according to claim 8, including the step of forming said solid target by injecting a burst of gas in a cryostat, the solidified gas at the cryostat outlet constituting said target.

10. A method according to claim 7, including the step of directing said laser beam along the axis of said nozzle.

11. A method according to claim 10, the step of producing said laser plasma occurring when said discharge of the focus type substantially reaches the axis of the nozzle, and continuing said discharge.

* * * * *